(12) United States Patent
Christen et al.

(10) Patent No.: US 8,784,266 B2
(45) Date of Patent: Jul. 22, 2014

(54) METHOD FOR OPERATING AN AUTOMATIC START/STOP SYSTEM IN A VEHICLE

(75) Inventors: Urs Christen, Aachen (DE); Markus Kees, Grevenbroich (DE); Gilberto Burgio, Trento (IT); Rainer Busch, Aachen (DE); Thomas Rambow, Aachen (DE); Uwe Gussen, Huertgenwald (DE)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 13/450,664

(22) Filed: Apr. 19, 2012

(65) Prior Publication Data

US 2012/0270701 A1 Oct. 25, 2012

(30) Foreign Application Priority Data

Apr. 20, 2011 (DE) .......................... 10 2011 007 716

(51) Int. Cl.
*F16D 48/06* (2006.01)

(52) U.S. Cl.
USPC .......................................... 477/171; 477/903

(58) Field of Classification Search
USPC ................. 477/166, 170–173, 183, 184, 903
See application file for complete search history.

(56) References Cited

U.S. PATENT DOCUMENTS

| 6,322,477 | B1 * | 11/2001 | Eich et al. ........................ 477/97 |
| 7,670,262 | B2 * | 3/2010 | Minaki et al. .................. 477/180 |
| 2011/0256981 | A1 * | 10/2011 | Saito et al. .................... 477/183 |
| 2012/0143481 | A1 * | 6/2012 | Yu et al. ........................ 701/113 |

FOREIGN PATENT DOCUMENTS

| DE | 4213589 | A1 | 11/1992 |
| DE | 10349445 | A1 | 5/2004 |
| WO | 02063163 | A1 | 8/2002 |
| WO | 02094601 | A2 | 11/2002 |
| WO | 03049969 | A2 | 6/2003 |
| WO | 2004024490 | A1 | 3/2004 |
| WO | 2009152966 | A2 | 12/2009 |

\* cited by examiner

*Primary Examiner* — Justin Holmes
(74) *Attorney, Agent, or Firm* — David B. Kelley; Brooks Kushman P.C.

(57) ABSTRACT

The disclosure relates to methods for operating an automatic start/stop system in a motor vehicle having an internal combustion engine and an automatic clutch, wherein the automatic start/stop system automatically opens the clutch as a function of propulsion requests, wherein the automatic opening of the clutch is prohibited in certain driving situations such as detected hazardous situations.

6 Claims, 1 Drawing Sheet

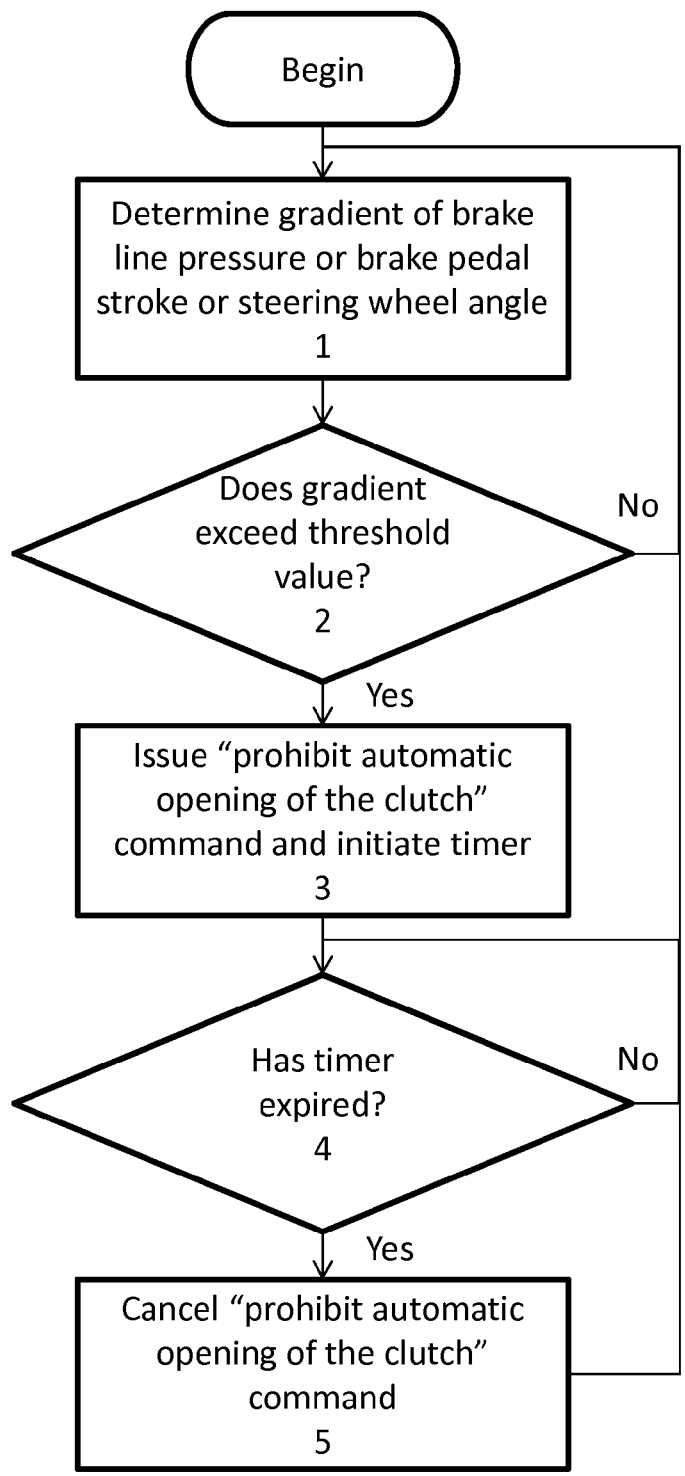

US 8,784,266 B2

METHOD FOR OPERATING AN AUTOMATIC START/STOP SYSTEM IN A VEHICLE

CROSS-REFERENCE TO RELATED APPLICATION

This application claims foreign priority benefits under 35 U.S.C. §119(a)-(d) to DE 10 2011 007 716.2, filed Apr. 20, 2011, the disclosure of which is hereby incorporated by reference in its entirety.

TECHNICAL FIELD

This disclosure relates to a method and to a device for operating an automatic start/stop system in a motor vehicle having an internal combustion engine and an automatic clutch.

BACKGROUND

The term micro hybrid vehicles is used to refer to motor vehicles having an internal combustion engine, a rather conventionally dimensioned electric starting motor, in particular what is referred to as a crankshaft starter motor (ISG, integrated starter generator), and a brake energy recuperation system for charging a starter accumulator with rather small dimensions. The internal combustion engine can be stopped, i.e. switched off, automatically by means of the automatic start/stop system if no propulsion is required, for example by coasting to a standstill, and can be re-started if the driver calls for power again. Alternatively, the internal combustion engine can easily be decoupled from the rest of the drive train and operated in the idling mode.

The automatic start/stop system stops the internal combustion engine on condition that the driver does not depress the accelerator pedal since at this moment no propulsion is required. The internal combustion engine is then decoupled from the rest of the drive train and either operated in the idling mode or, as already mentioned, switched off entirely. In both cases, there is a saving in fuel since the drag torque of the engine, which is obtained at the cost of the movement energy of the motor vehicle, is eliminated, with the result that the deceleration of the vehicle is reduced. In the first case, referred to as the coasting mode, in which the internal combustion engine carries on running in the idling mode, electric current is still generated, with the result that the power supply of the electrical loads in the motor vehicle is ensured in all cases. In the second case, referred to as free rolling or the rolling start/stop mode, the electrical loads in the motor vehicle have to be supplied with current by the battery, and the re-charging of the battery consumes additional fuel during times in which the internal combustion engine is running.

Both specified methods, the coasting mode and free rolling, can be applied in all drive trains which can be automatically opened in some way or other. This applies, of course, to automatic transmissions (conventional torque converter or double-clutch transmissions) and also to automated shifting mechanisms (ASM), continuously variable transmissions (CVT) and to manual shift transmissions which are equipped with an automatic, i.e. electrically or electronically activated, clutch.

The opening of the drive train at the beginning of a fuel saving phase influences the driving dynamics since the drag torque of the internal combustion engine which occurs when the accelerator pedal is not depressed disappears when the drive train is opened. In many driving situations, for example when traveling downhill, this may be undesired. It is also possible to provide that opening of the drive train occurs with a certain delay, for example in order to avoid continuous engagement and disengagement of the clutch. Various situations in which the automatic opening of the drive train can be prohibited or delayed with an automatic start/stop system are described in the following documents: EP 1 358 405 B1, EP 1 453 695 B1, EP 1 534 554 B1, DE 10 2008 029 453 A1, DE 10 349 445 A1, DE 10 221 701 A1 and DE 4 213 589 A1.

SUMMARY

A method for operating a start/stop system in a vehicle having an engine and automatic clutch includes issuing, when the start/stop system is operating, a prohibit open clutch command in response to the automatic clutch being closed and a change in brake line pressure over time or a change in brake pedal stroke over time being greater than a threshold value such that the automatic clutch remains closed and automatic stopping of the engine is precluded for a predetermined period of time.

A method for operating a start/stop system in a vehicle having an engine and automatic clutch includes issuing, when the start/stop system is operating, a prohibit open clutch command in response to the automatic clutch being closed and a change in steering wheel angle over time being greater than a threshold value such that the automatic clutch remains closed and automatic stopping of the engine is precluded for a predetermined period of time.

A method for operating a start/stop system in a vehicle having an engine, drivetrain, and automatic clutch arranged to couple the engine and drivetrain when closed includes issuing, when the start/stop system is operating, a prohibit close clutch command in response to the automatic clutch being open and a change in steering wheel angle over time being greater than a threshold value such that the automatic clutch remains open and the engine remains decoupled from the drivetrain for a predetermined period of time.

BRIEF DESCRIPTION OF THE DRAWING

FIG. 1 is a flow chart of an algorithm for determining when to issue clutch commands.

DETAILED DESCRIPTION

Embodiments of the present disclosure are described herein. It is to be understood, however, that the disclosed embodiments are merely examples and other embodiments can take various and alternative forms. Specific structural and functional details disclosed herein are not to be interpreted as limiting, but merely as a representative basis for teaching one skilled in the art to variously employ the present invention. As those of ordinary skill in the art will understand, various features illustrated and described with reference to any one embodiment can be combined with features illustrated in one or more other embodiments to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A motor vehicle (not shown) with an internal combustion engine and an automatic, specifically electrically or electronically activated, clutch has an automatic start/stop system which opens the clutch and allows the internal combustion engine either to run in the idling mode or switches it off entirely if no propulsion is required at that particular time.

The motor vehicle contains an electronic engine control unit and one or more on-board computers for carrying out a multiplicity of functions, including the automatic start/stop system, as well as a multiplicity of sensors, including a sensor for sensing the current steering wheel angle and a sensor for sensing the current brake pedal stroke or brake line pressure.

Furthermore, the motor vehicle can have a driver assistance system or a collision avoidance system which assesses the hazard potential of a current driving situation on the basis of the signals from further sensors, such as, for example, distance sensors, and/or on the basis of information which it receives from other vehicles, for example by radio communication or infrared communication, and if appropriate warns the driver of a hazard situation and/or prepares restraint systems for possible activation, for example by activating a seat-belt pre-tensioner.

In a state in which the motor vehicle moves forward without a propulsion request by the driver, a possible control strategy of the automatic start/stop system is to open the clutch immediately and either place the internal combustion engine in the idling mode or switch it off entirely. An alternative control strategy is that this is brought about only in respect to a clearly recognizable driver request, for example because the driver switches into the idling mode, or after a certain delay which can depend on operating states such as, for example, the speed of the vehicle or the gear speed which is engaged at that particular time.

Referring to FIG. 1, if the automatic start/stop system is operating, the current brake pedal stroke, or the brake line pressure which correlates therewith, is read in continuously and the gradient thereof determined, i.e. the change in the brake line pressure and/or the brake pedal stroke over time (step 1 in the FIGURE). In step 2 it is determined whether this gradient exceeds a predetermined threshold value. As long as the gradient does not exceed the predetermined threshold value, the steps 1 and 2 are repeated. If the gradient exceeds the predetermined threshold value, in step 3 a command "prohibit automatic opening of the clutch" is output to the engine control unit or to the on-board computer which implements the automatic start/stop system. At the same time in step 3 a timer is started which runs for a predetermined time period. In step 4 it is repeatedly determined whether the predetermined time period has expired. If the predetermined time period has expired, in step 5 the command "prohibit automatic opening of the clutch" is canceled and the method returns to step 1.

If the gradient in step 2 exceeds the predetermined threshold value, this is an indication of a hazardous situation since a driver often steps hard on the brake pedal when faced with a surprising hazardous situation. The prohibition of the automatic opening of the clutch means that the surprising of the driver is not increased further by any unexpected vehicle reaction.

As described, the command "prohibit automatic opening of the clutch" prohibits automatic opening of the clutch by the automatic start/stop system if the clutch is closed at that particular time. In addition, automatic closing of the clutch can also be prohibited by the automatic start/stop system if the clutch is opened at that particular time. That is to say, the operating state of the clutch is not changed. If the vehicle is currently in the coasting mode or is rolling freely, the coasting mode or the free rolling is continued independently of the normal control strategy of the automatic start/stop system, and if the automatic start/stop system would like to change from the normal engine drive to the coasting mode or free rolling during the predetermined time period in which the timer which is started in step 3 is running, this is also prohibited.

In addition to the method described above, a sequence of steps is carried out which differs from the sequence of steps described above only in that in step 1 it is not the brake pedal stroke or brake line pressure that is read in but rather the current steering wheel angle is read in and the gradient thereof determined, and in that in step 2 the absolute value of the steering wheel angle gradient is compared with a predetermined threshold value. If the absolute value of this gradient exceeds the predetermined threshold value, this is also an indication of a hazardous situation since a driver quickly rotates the steering wheel, for example in order to avoid an object, when faced with many a surprising hazardous situation. The prohibition of the automatic opening of the clutch means that the surprising of the driver is not increased further by any unexpected vehicle reaction.

In addition to the methods described above, a sequence of steps can be carried out which differs from the sequences of steps described above only in that in step 1 it is determined whether the driver has performed any action in order to alert other road users to a hazard situation detected by him, for example has switched on the hazard warning light system, in which case if there is a positive reply to this in step 2, the system continues with step 3.

In addition to the methods described above, a sequence of steps can be carried out which differs from the sequences of steps described above only in that in step 1 a driver assistance system or collision avoidance system is interrogated to determine whether said system has detected any hazardous situation, in which case if there is a positive reply to this in step 2, the system continues with step 3.

The threshold value used in step 2 and/or the time period for which the timer runs and which is used in steps 3 and 4 do not have to be fixed values but rather can depend on the type of the criterion determined in step 1 and on further suitable criteria, such as, for example, the current driving speed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for operating a start/stop system in a vehicle having an engine and automatic clutch comprising:
    issuing, when the start/stop system is operating, a prohibit open clutch command in response to (i) the automatic clutch being closed and (ii) a change in brake line pressure over time or a change in brake pedal stroke over time being greater than a threshold value such that the automatic clutch remains closed and automatic stopping of the engine is precluded for a predetermined period of time.

2. The method of claim 1 wherein the predetermined period of time depends on a speed of the vehicle.

3. A method for operating a start/stop system in a vehicle having an engine and automatic clutch comprising:
    issuing, when the start/stop system is operating, a prohibit open clutch command in response to the automatic clutch being closed and a change in steering wheel angle over time being greater than a threshold value such that the automatic clutch remains closed and automatic stopping of the engine is precluded for a predetermined period of time.

4. The method of claim 3 wherein the predetermined period of time depends on a speed of the vehicle.

5. A method for operating a start/stop system in a vehicle having an engine, drivetrain, and automatic clutch arranged to couple the engine and drivetrain when closed, the method comprising:
    issuing, when the start/stop system is operating, a prohibit close clutch command in response to the automatic clutch being open and a change in steering wheel angle over time being greater than a threshold value such that the automatic clutch remains open and the engine remains decoupled from the drivetrain for a predetermined period of time.

6. The method of claim 5 wherein the predetermined period of time depends on a speed of the vehicle.

* * * * *